W. H. & G. H. Little.
Impts in Car Trucks.
117182
Patented Jul 18 1871
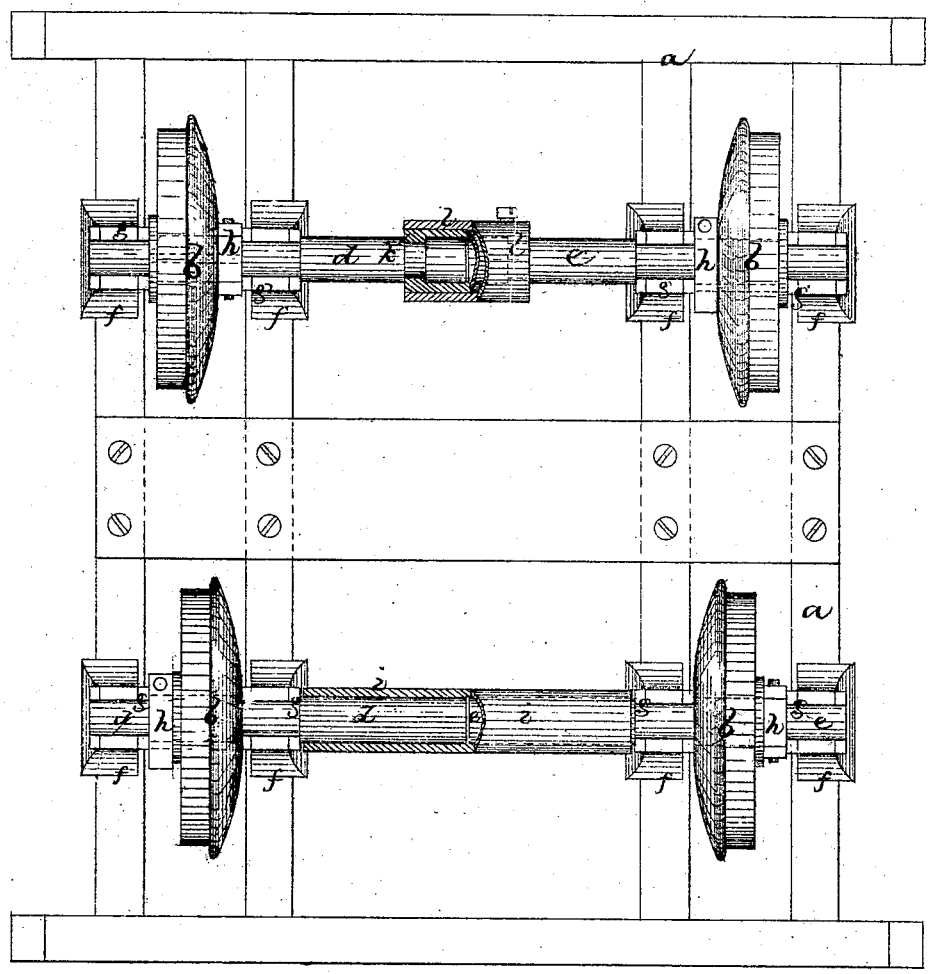
Witnesses.
M. W. Frothingham.
L. H. Latimer.
W. H. Little & George H. Little.
By their Attys.
Crosby & Gould

UNITED STATES PATENT OFFICE.

WILLIAM H. LITTLE AND GEORGE H. LITTLE, OF PEABODY, MASSACHUSETTS.

IMPROVEMENT IN CAR-TRUCKS.

Specification forming part of Letters Patent No. 117,182, dated July 18, 1871.

*To all whom it may concern:*

Be it known that we, WILLIAM H. LITTLE and GEORGE H. LITTLE, of Peabody, in the county of Essex and State of Massachusetts, have jointly invented certain Improvements in Car-Trucks; and we do hereby declare that the following, taken in connection with the drawing which accompanies and forms part of this specification, is a description of our invention, sufficient to enable those skilled in the art to practice it.

Our invention relates particularly to the construction or organization of that class of car-trucks designed to run both upon wide and narrow-gauge tracks by means of wheels which may be disposed laterally, or as to distance apart, to conform to either gauge.

In most of the constructions designed for this purpose the wheels slide upon axles which extend entirely across the car-truck and which are journaled, like ordinary axles, at, and only at, the outer ends of the axles, or at the outer sides of the wheels. Short axles journaled upon both sides of the wheels have been made for such trucks; but in such construction each axle has been made to slide endwise, the wheel being fixed upon the axle. In our construction we use for each pair of wheels two short axles, each journaled at both sides of its wheel and having no sliding movement, but having wheels made to slide upon the axles; and the two axles of each pair of wheels we couple together by a suitable coupling-sleeve or collars, each axle being provided with a suitable locking device to keep the wheel in position for either a wide or narrow-gauge track. We prefer to connect the two axles of each pair by an encompassing sleeve of such length as to sustain the axles in relative position or in axial line, this being applicable to the short axles journaled upon each side of each wheel, irrespective of the provision for lateral movement of the wheels.

It is in a car-truck for wide and narrow-gauge tracks, having short axles journaled upon opposite sides, and each wheel made to slide upon its axle, with provision for retaining it in position for either a wide or narrow track, that our invention consists.

The drawing represents, in reversed plan, a car-truck embodying our improvements, one pair of wheels being shown in position for a wide track and the other in position for a narrow track.

$a$ denotes the truck-frame; $b\ b\ c\ c$, the wheels; $d\ e$, the axles; $f$, the housings; $g$, the journal-boxes. The lower parts of the boxes are not shown. Each wheel is splined to its axle, so that the wheel and axle turn together, and so that the wheel may slide upon the axle, and each wheel is confined in proper position upon the axle (for either track) by a suitable locking device or clamp, a clamp, $h$, being shown in the drawing for this purpose. The two axles in line are journaled at each side of the wheel, the housings for each axle being brought as near together as is practicable with reference to the lateral movement of the wheel; and the inner end of each axle projects beyond the housing so that the two adjacent ends of the two axles may be coupled together by an encompassing sleeve, $i$, extending from housing to housing, or by collars $k$ and a sleeve, $l$, or by any other suitable devices which couple the axles but permit them to have relative rotative movements. When wheels are made to slide upon their axles for adjustment to position for varying widths of rack, the looseness of the wheel upon the axle (as compared to the fixedness of an ordinary car-wheel and its axle) requires the wheel to be very carefully supported upon its axle, and the axle to be very carefully supported in its journals, to avoid accidents; and, as such a wheel and axle cannot withstand the lateral strain to which an ordinary wheel and axle are subjected, it requires (to run properly) to be not only rigidly supported, but to be free from connection with the opposite wheel, so that the axle of each wheel is supported by itself, and the two may turn independently. By our invention this is accomplished, each wheel being supported by immediate juxtaposition with either one or the other of the housings of its axle, in whichever position it be made to assume, and each turning independently of the other, so that the lateral strain upon one has no effect upon the other, while by coupling the two together they then have the connected support furnished by the coupling-sleeve.

We claim—

For wide and narrow-gauge tracks, a car-truck having wheels sliding upon the axles, when the axles for each pair of wheels are independent, and are journaled in housings upon each side of each wheel, substantially as shown and described.

WM. H. LITTLE.
GEORGE H. LITTLE.

Witnesses:
FRANCIS GOULD,
M. W. FROTHINGHAM.